(12) United States Patent
Deriche

(10) Patent No.: US 8,597,019 B2
(45) Date of Patent: Dec. 3, 2013

(54) NOZZLE AND SYSTEM FOR INJECTING THERMOPLASTIC MATERIAL

(75) Inventor: Eric Deriche, Mery (FR)

(73) Assignee: Runipsys Europe, Mery (FR)

( * ) Notice: Subject to any disclaimer, the term of this patent is extended or adjusted under 35 U.S.C. 154(b) by 52 days.

(21) Appl. No.: 13/378,542

(22) PCT Filed: Jun. 17, 2010

(86) PCT No.: PCT/EP2010/058556
§ 371 (c)(1),
(2), (4) Date: Dec. 15, 2011

(87) PCT Pub. No.: WO2010/146124
PCT Pub. Date: Dec. 23, 2010

(65) Prior Publication Data
US 2012/0100242 A1 Apr. 26, 2012

(30) Foreign Application Priority Data
Jun. 17, 2009 (FR) ...................... 09 54065

(51) Int. Cl.
*B29C 45/20* (2006.01)
(52) U.S. Cl.
USPC ...................... 425/549; 264/328.15
(58) Field of Classification Search
USPC ...................... 425/547; 264/328.15
See application file for complete search history.

(56) References Cited

U.S. PATENT DOCUMENTS

| 4,712,995 | A | 12/1987 | Basnett |
| 5,162,125 | A | 11/1992 | Akselrud et al. |
| 6,220,851 | B1 * | 4/2001 | Jenko ............................ 425/549 |
| 7,189,071 | B2 * | 3/2007 | Olaru ............................ 425/549 |
| 7,614,869 | B2 * | 11/2009 | Babin et al. .................. 425/549 |
| 2005/0238748 | A1 | 10/2005 | Jenko |
| 2009/0194910 | A1 | 8/2009 | Rosner et al. |
| 2011/0236526 | A1 | 9/2011 | Deriche |

FOREIGN PATENT DOCUMENTS

| EP | 1 447 199 | 8/2004 |
| FR | 2 821 010 | 8/2002 |
| FR | 2 831 644 | 5/2003 |
| WO | WO 2007/006899 | 1/2007 |
| WO | WO 2007/051857 | 5/2007 |

* cited by examiner

*Primary Examiner* — Tim Heitbrink
(74) *Attorney, Agent, or Firm* — Harness, Dickey & Pierce, P.L.C.

(57) ABSTRACT

The present disclosure includes a nozzle for injecting thermoplastic material in fluid state including two portions sliding in a sealed fashion, the first portion including a nozzle body which, in a longitudinal injection direction, has a longitudinal channel through which the thermoplastic material passes, the second portion including a linking ring having a passage in which the nozzle body is able to slide in sealed manner, and a resilient load member cooperating with the two portions to urge the nozzle body in the forward longitudinal direction and the linking ring in the backward longitudinal direction.

12 Claims, 7 Drawing Sheets

NOZZLE AND SYSTEM FOR INJECTING THERMOPLASTIC MATERIAL

CROSS-REFERENCE TO RELATED APPLICATIONS

This application is a National Stage of International Application No. PCT/EP2010/058556, filed on Jun. 17, 2010, which claims priority to French Patent Application Serial No. 0954065, filed on Jun. 17, 2009, both of which are incorporated by reference herein.

FIELD OF THE INVENTION

The present invention concerns a nozzle and a system for injecting thermoplastic material in the fluid state into a mould cavity.

BACKGROUND

An injection system of "hot block" or "hot runner" type usually comprises:
- a rigid moulding die having a front face partly delimiting the mould cavity, a rear face and at least one longitudinal passage passing through the die from its rear face to its front face,
- a longitudinal injection nozzle, arranged coaxially inside said passage and comprising a longitudinal channel,
- a manifold feeding the channel of the nozzle with thermoplastic material in the fluid state, located behind the rear face of the die and mechanically connected thereto, said manifold comprising a longitudinal feed channel leading towards the front in fluid relationship with the longitudinal channel of the nozzle.

This type of injection system further comprises feed means capable of providing the manifold with material to be injected. For satisfactory injection of material into the mould cavity, the material must be held in the fluid state, this state being obtained when the material is brought to a determined limit temperature, higher than the temperature of ambient air. For this purpose the manifold, as is known per se, comprises means allowing the holding of its temperature, and hence the temperature of the material transiting through its dispensing channel, at a so-called "injection temperature" higher than the limit transition temperature to the fluid state of the material.

The material in the fluid state is placed in the dispensing channel of the manifold via feed means and enters into the transit passage of the injection nozzle. The injection nozzle is also provided with heating means which typically consist of an electric resistance wound around the nozzle. It is additionally necessary to ensure sealing of the nozzle both at its rear end, with respect to the manifold, and at its front end, with respect to the front face of the die. Existing means for ensuring a seal at the two ends of the nozzle do not give full satisfaction however.

FIGS. 1A to 1C illustrate three widespread modes for securing the injection nozzle. In these three systems, the seal at the front end of the nozzle 2 with respect to the die 1 is ensured at the diameter D of the front part 21 of the nozzle. In the configuration shown in FIG. 1A, the nozzle is secured to the manifold 3 via its rear end 22 by means of a screw V.

During variations in temperature of the injection system, the manifold 3 expands crosswise, to the extent of the flexibility of the screws V. In addition the nozzle may bend slightly without, however, jeopardizing the seal at the diameter D. The nozzle 2 is able to expand longitudinally in direction X, sliding along the diameter D. As a result, the position of the tip 23 of the nozzle relative to the orifice 14 provided in the die may vary depending on the expansion of the nozzle.

In particular, for small injection gates (an injection gate being the passage through which the thermoplastic material moves from the nozzle into the mould cavity), clogging of the injection gate may occur or it may lose equilibrium. Yet, if the material is heated more to make it more fluid, the nozzle expands accordingly and tends even further to shut off the injection gate. Said system is therefore particularly difficult to adjust.

In addition, in multi-cavity systems, the nozzles may expand differently leading to largely heterogeneous filling of the cavities. These problems also occur with the system in FIG. 1B, in which the manifold 3 is secured to the die 1 by means of screws V (of which only one is illustrated here) and with the system in FIG. 1C in which an elastic washer R urges the rear end 22 of the nozzle towards the manifold 3. In all these cases, the size of the injection gate is therefore dependent upon the temperature of the system.

Another system is described in document WO 2007/051857. In this document, the nozzle bears flatly upon an incompressible ring. To compensate for heat expansions of the nozzle, the rear of the nozzle is mobile by sliding inside the manifold. An elastic disc urges the front part of the nozzle onto the incompressible ring.

However, on account of the strong variations in temperature of the manifold, expansion of the manifold is also observed in a transverse direction i.e. perpendicular to the axis of the nozzle. By dilating transversally, the manifold drives with it the rear of the nozzle which is housed therein, causing bending of the nozzle. Yet, this bending, especially if the nozzle is short, causes its front face to lose some of its flat bearing, and hence a sealing loss. Flat surface sealing is much more sensitive than sealing on the diameter. Also, the elastic disc creates a heat bridge which locally cools the material circulating in the nozzle. In addition, the incompressible ring is subjected to shear forces which are detrimental thereto.

It is therefore sought to design means for ensuring a seal at the two ends of the nozzle whilst avoiding the above-mentioned problems. In particular, the injection system must allow precise, repeatable positioning of the nozzle tip to be obtained together with tolerance of the thermal expansion of the different components of the injection system, in particular the transverse expansion of the manifold.

SUMMARY

According to the invention, there is proposed a nozzle for injecting thermoplastic material in the fluid state, comprising two portions which slide in sealed manner with respect to one another,
- the first portion comprising a nozzle body having, in a longitudinal direction of injection, a longitudinal channel through which the thermoplastic material passes,
- the second portion comprising a linking ring having a passage in which the nozzle body is able to slide in sealed manner,
and resilient load means cooperating with the two portions to urge the nozzle body in forward longitudinal direction and the linking ring in backward longitudinal direction.

Advantageously, said resilient load means comprise a first elastic member arranged so as to urge the linking ring backwardly, a second elastic member arranged to urge the nozzle body forwardly, and the second elastic member is arranged between the linking ring and a support element secured to the nozzle body.

A further subject of the invention concerns a system for injecting a thermoplastic material in the fluid state into a mould cavity which, with reference to a longitudinal direction of injection, comprises:
- a rigid moulding die, having a front face partly delimiting the mould cavity, a rear face and at least one longitudinal passage passing through the die from its rear face to its front face,
- a longitudinal injection nozzle, arranged coaxially inside said passage and comprising a longitudinal channel,
- a manifold feeding the channel of the nozzle with thermoplastic material in the fluid state, located behind the rear face of the die and mechanically linked therewith, said manifold comprising a longitudinal feed channel leading towards the front.

This system is characterized in that the nozzle comprises two portions sliding in sealed fashion with respect to one another:
- the first portion comprising a nozzle body of which one front region bears upon the die,
- the second portion comprising a linking ring having a passage in which the nozzle body is able to slide in sealed fashion and comprising a rear face in sliding contact against the front face of the manifold, and resilient load means cooperating with the two portions to urge the nozzle body in forward longitudinal direction and the linking ring in backward longitudinal direction.

Preferably, the front end of the nozzle bears flatly, via a shoulder, against an annular sealing ring.

According to one preferred embodiment of the invention, said resilient load means comprises:
- a first elastic member arranged between the rear face of the die and the linking ring so as to ensure, on said linking ring, a backward longitudinal reaction,
- a support washer rigidly secured to the nozzle body,
- a second elastic member arranged between said linking ring and the support washer so as to ensure, on said support washer, a forward longitudinal reaction.

In particularly advantageous manner, at ambient temperature, the axis of the channel of the manifold is offset transversally relative to the axis of the channel of the nozzle, by a distance substantially equal to the transverse expansion of the manifold when it is brought from ambient temperature to injection temperature, so that at the time of injection the channels of the manifold and of the nozzle are coaxial.

BRIEF DESCRIPTION OF THE DRAWINGS

Other characteristics and advantages of the invention will become apparent from the following detailed description with reference to the appended drawings in which.

DETAILED DESCRIPTION

Figure 1A:
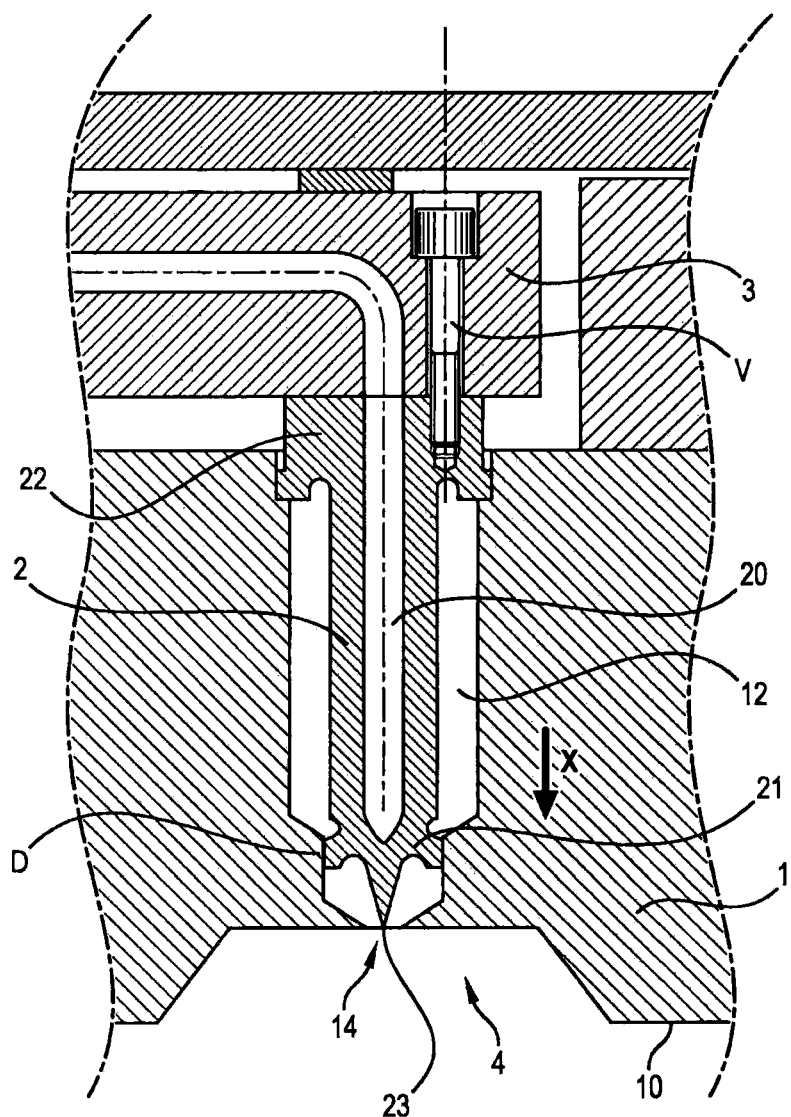
FIGS. 1A to 1C illustrate three conventional modes for securing an injection nozzle.
Figure 1B:
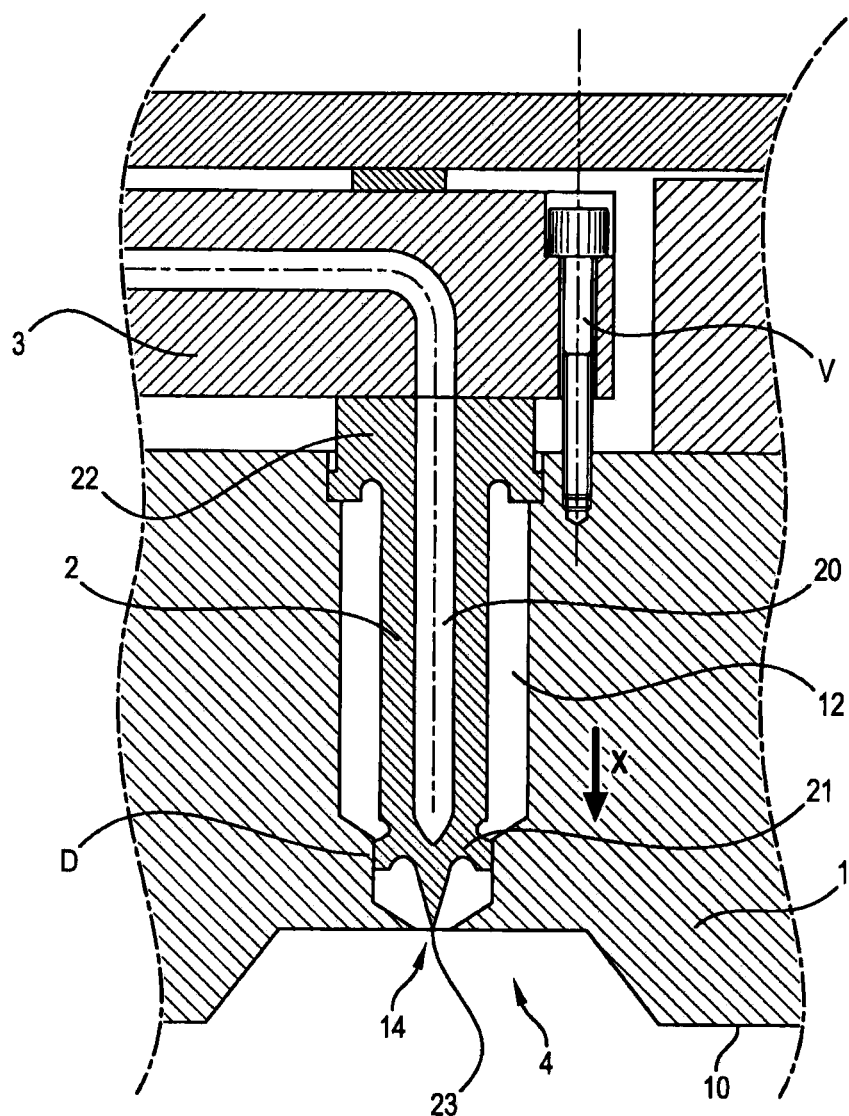
Figure 1C:
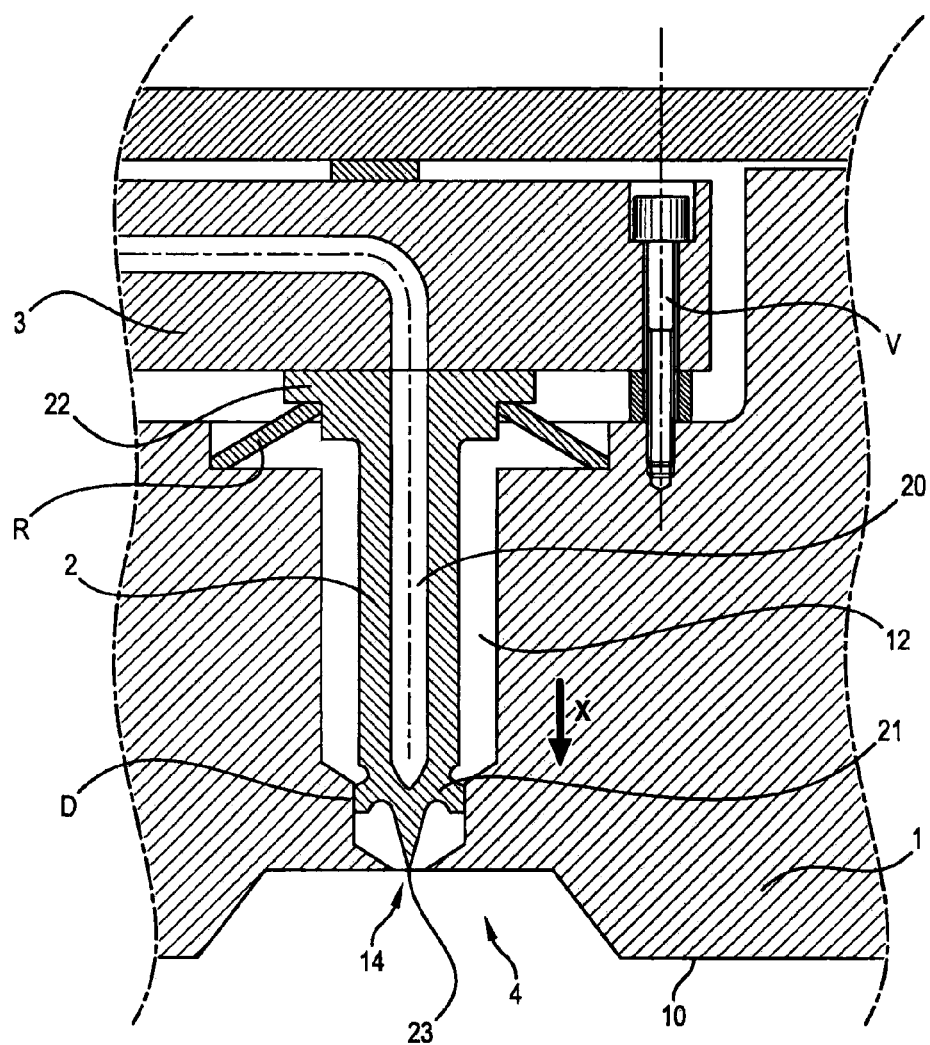
Figure 2:
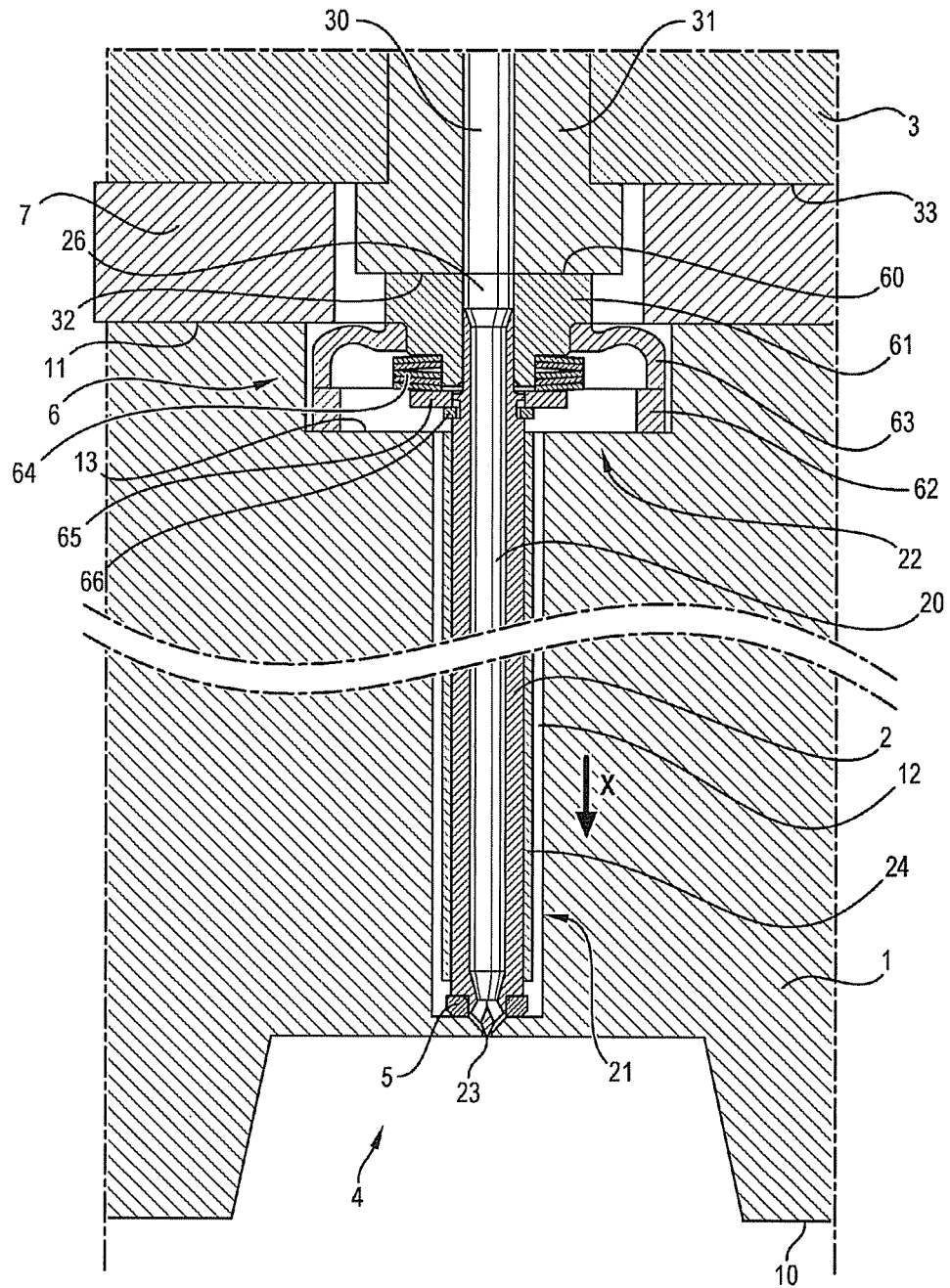
FIG. 2 is an overall view of the injection system according to the invention.

The injection system is illustrated in FIG. 2. The arrow X indicates the longitudinal direction of injection, and is oriented from the back towards the front of the injection system in the direction of injection. The injection system, in known manner, comprises a rigid die 1 which has a front face 10 partly delimiting the mould cavity 4. The die 1 also has a rear face 1 opposite the front face 10.

Through the die 1, from its rear face 11 to its front face 10, there passes at least one longitudinal passage 12 to house an injection nozzle. Evidently, the die 1 may comprise several longitudinal passages 12 to house several injection nozzles, said nozzles being able to feed one single mould cavity or several separate mould cavities. In addition, the die 1 does not necessarily form a single block, but may be formed of a stack of several plates. These variants are known to the person skilled in the art and will therefore not be described in detailed manner.

The injection system further comprises at least one longitudinal injection nozzle, arranged coaxially inside the passage 12 of the die 1. The injection nozzle comprises two portions 2, 61 arranged so that they slide in sealed manner with respect to one another. A first portion of the nozzle comprises a nozzle body 2 which innerly comprises a longitudinal channel 20 through which the thermoplastic material passes in the fluid state, this channel—at the front part 21 of the nozzle—leading into the mould cavity 4 via an injection orifice 14. The injection nozzle also comprises heating means to maintain the thermoplastic material circulating in the longitudinal channel 20 at the suitable injection temperature. These heating means are themselves known to the person skilled in the art and a particularly advantageous embodiment will be described in detail below.

The injection system also comprises a manifold 3 feeding the longitudinal channel 20 of the nozzle with thermoplastic material in the fluid state. The manifold 3 is located behind the rear face 11 of the die 1 and is mechanically linked therewith. The manifold 3 comprises an inner network of feed channels, linked to a longitudinal feed channel 30 leading into the front of the manifold 3 so that it comes to be aligned with the channel 20 of the nozzle to feed the latter with thermoplastic material.

When in operation i.e. when the injection system is brought to the injection temperature, the channel 20 and channel 30 are therefore coaxial. In general, the channel 30 of the manifold is formed in an insert 31 secured to the manifold 3 and whose front face 32 is ground. The front face 32 of the insert generally projects forwardly relative to the front face 33 of the manifold. The front face 32 is then considered to form part of the front face 33 of the manifold.

Annular Sealing Ring

Figure 3:
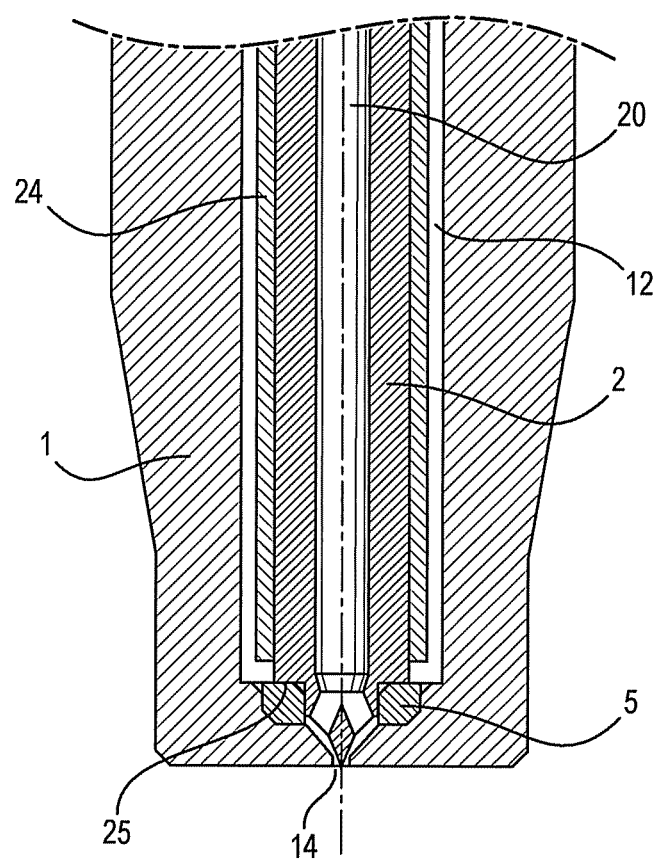
FIG. 3 shows details of the bearing of the front of the nozzle against the sealing ring.

In its front part 21, the nozzle body 2 rests against an annular sealing ring 5 placed in a housing provided for this purpose in the die 1. The ring is made in an incompressible, thermally insulating material e.g. in ceramic. As can be seen in FIG. 3, the contact between the front part 21 of the nozzle body and the ring 5 is achieved via flat surface bearing by means of a shoulder 25 of the nozzle. The ring 5 also lies flat inside its housing in the die.

Compared with prior art solutions, the ring 5 allows guarantying precise, repeatable and temperature-independent positioning of the outlet orifice of the nozzle 2, since it is located as near as possible to this orifice. In addition, it is only subjected to compression stresses.

Resilient Load Means

Figure 4:
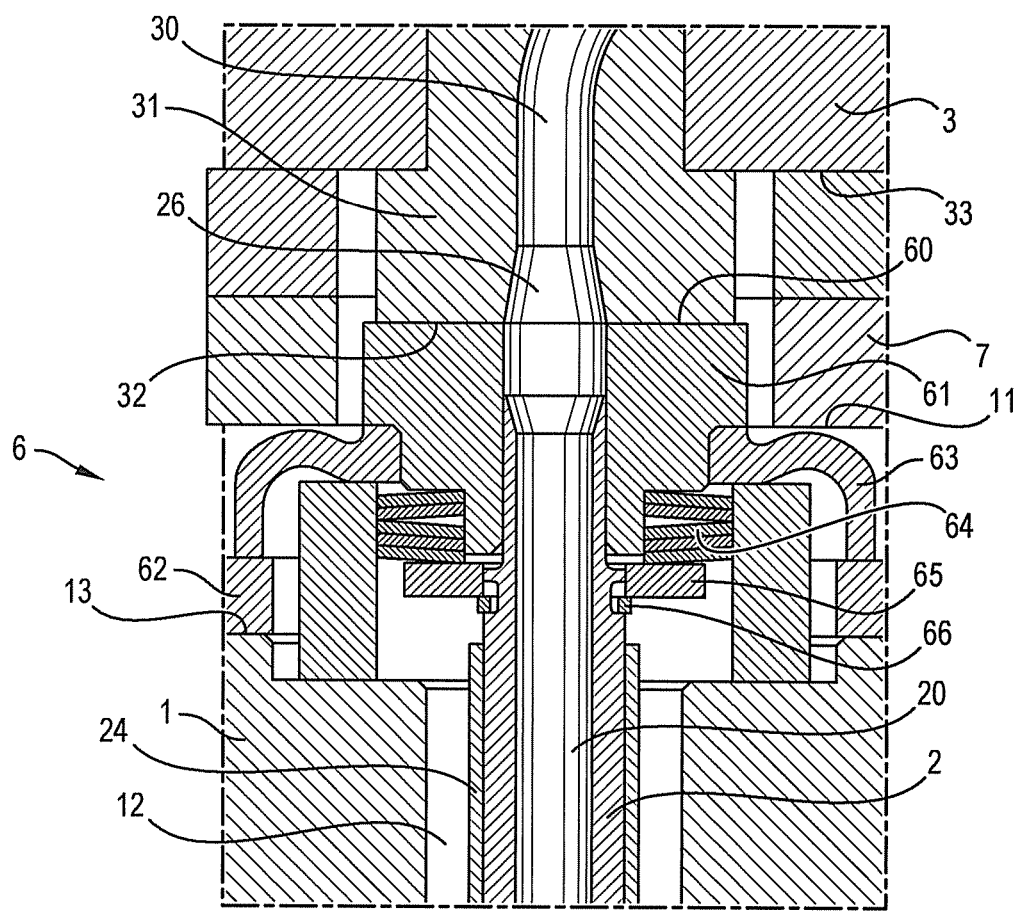
FIG. 4 shows details of the resilient load means at the rear of the nozzle, according to a first embodiment of the invention.

The nozzle also comprises a second portion which comprises a linking ring 61 having a passage 26 in which the nozzle body is able to slide in sealed manner. The linking ring 61 is arranged in a rear region 22 of the nozzle body so that relative longitudinal sliding is possible between the nozzle body 2 and the linking ring 61. As can be better seen in FIG. 4, which illustrates a first embodiment of the invention, the rear face 60 of the linking ring 61 bears against the manifold (and more precisely on the front face 32 of the insert 31), so that relative sliding between said faces 60 and 32 is possible.

The nozzle also comprises resilient load means 6 whose function is to apply a force on the nozzle body 2 in the forward longitudinal direction and on the linking ring 61 in the backward longitudinal direction, to ensure a seal with regard to the sealing ring 5 and the manifold 3 respectively, independently of the expansions of the manifold. In addition, the resilient load means 6 comprise a support washer 65 secured to the rear part 22 of the nozzle body, for example by press-fitting into a groove provided for this purpose and held by an elastic ring such as a circlip 66. According to one variant, the support washer 65 is an integral part of the nozzle and is formed by a shoulder arranged thereupon.

The linking ring 61 is mounted on the rear part 22 of the nozzle body against the urging, oriented backwardly, of a first elastic member 63 bearing upon the rear face 11 of the die 1, and more precisely against the bottom 13 of a housing formed on the rear face 11 of the die. The bottom 13 is considered to form part of the rear face of the die 11. This first elastic member 63, for example, is in the form of an elastic washer such as a "Belleville" washer arranged bearing upon a washer 62. The function of this first elastic member 63 is therefore to press the linking ring 61 flat against the manifold. It thereby maintains a sliding contact between the rear face 60 of the linking ring and the front face 32 of the manifold.

The resilient load means 6 also comprise a second elastic member 64 arranged between the support washer 65 and the linking ring 61. This second elastic member 64, which is in the form of a spring for example, applies a forward longitudinal force on the support washer 65. Therefore the function of this second elastic member is to urge the front part 21 of the nozzle body 2 against the sealing ring 5. The resilient load means therefore allow ensuring urging of the two ends of the nozzle against the sealing ring and against the front face of the manifold respectively.

Figure 5:
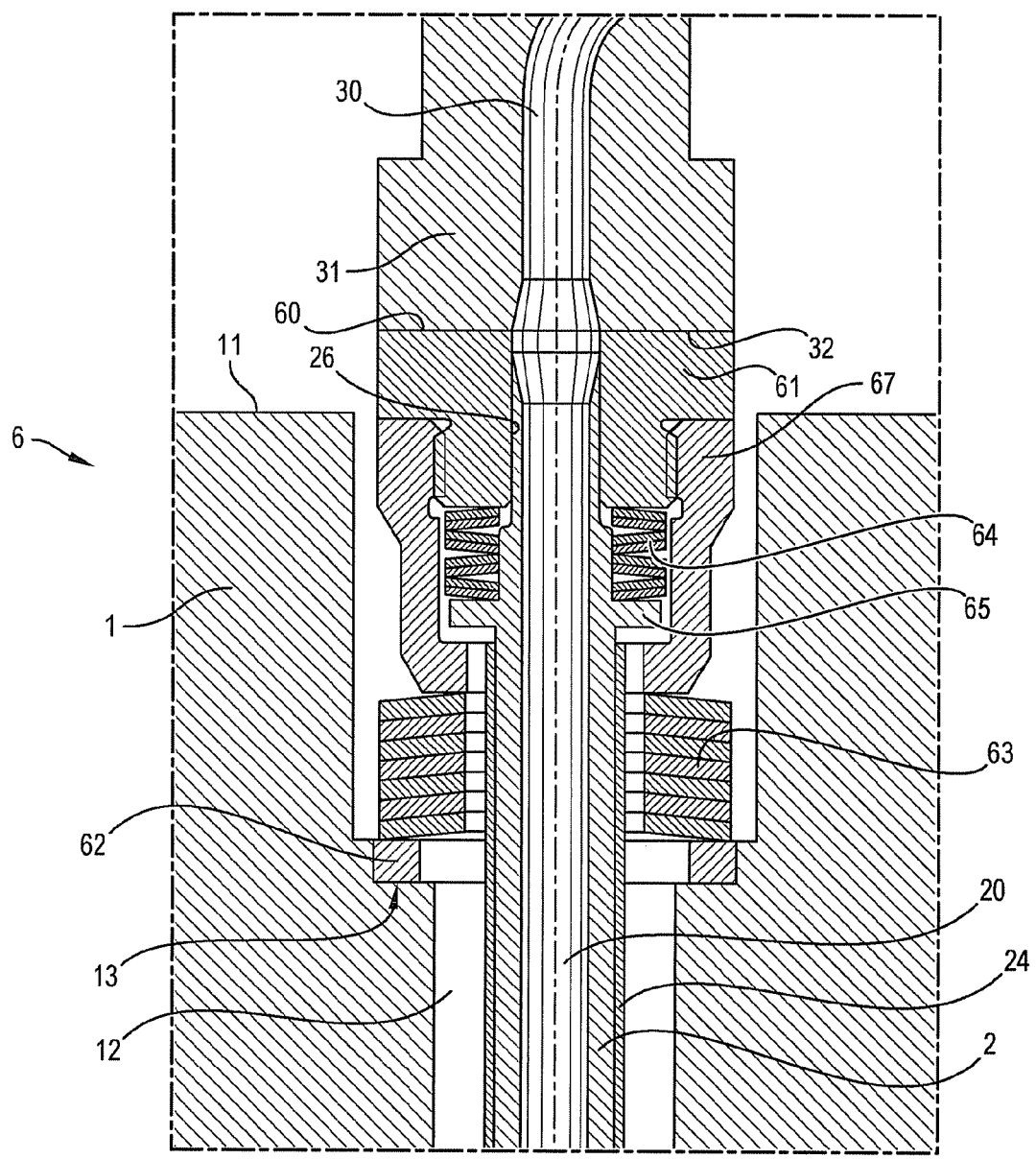
FIG. 5 shows details of the resilient load means at the rear of the nozzle according to a preferred embodiment of the invention.

FIG. 5 illustrates a preferred embodiment of the invention. In this embodiment, a nut 67 screwed onto the linking ring 61 also surrounds the second elastic member 64 arranged between the front face of the linking ring 61 and the shoulder 65 arranged on the nozzle body 2. The second elastic member 64 therefore urges the nozzle body forwards.

In addition, the first elastic member 63 bears against the bottom 13 of a housing formed on the rear face 11 of the die. In particularly advantageous manner, a washer 62 made in incompressible and thermally insulating material is inserted between the bottom 13 and the first elastic member 63 so as to avoid any heat bridge between the latter and the die 1. The first elastic member 63 urges the nut 67, and hence the linking ring 61, backwards against the front face of the manifold. This embodiment has the advantage of simplifying maintenance operations since, when the injection nozzle is dismounted, all the components of the resilient load means remain trapped in the nut 67.

It will be understood that the resilient load means can be used whether or not the injection system is subjected to expansion stresses. Even when the system is at ambient temperature, the resilient load means effectively exert a "prestress" force on the nozzle. However it has the particular advantage of ensuring a seal at the two ends of the nozzle when the different components of the system are subjected to thermal expansions.

When the manifold expands in a transverse direction perpendicular to the longitudinal direction of injection, it slides on the rear face 60 of the linking ring 61. It therefore does not cause any bending of the nozzle, which guarantees maintaining the flat bearing against the ring 5 and hence the sealing at this level. Also, when the nozzle body 2 expands longitudinally, the force applied by the second elastic member 64 increases, the effect of which is to reinforce the urging of the front part of the nozzle. Therefore, the sealed sliding of the two portions of the nozzle allows thermal expansions of the nozzle to be absorbed.

The sizing of the injection system must therefore take into account the respective expansions of the different components at the time of increase from ambient temperature to injection temperature. In particular, since the manifold 3 tends to expand in a transverse direction, perpendicular to the longitudinal direction, the longitudinal channel 30 of the manifold at ambient temperature must be slightly offset from the channel 20 of the nozzle.

The offset between the axes of the channels 20 and 30 must correspond to the expansion that will be undergone by the manifold (i.e. the distance by which the axis of channel 30 will move) so that at the injection temperature the axes of the channels 20 and 30 are aligned. The determination of this offset is within the reach of the person skilled in the art in relation to the material used, to the dimensions of the manifold and to the position of the nozzle under consideration. Typically, the offset is of the order of a few hundredths of a mm to a few mm.

Device for Heating the Injection Nozzle

To maintain the plastic material at the desired temperature in the longitudinal channel 20 of the nozzle, the nozzle comprises heating means. Preferably, the heating means are composed of a heating sleeve 24 surrounding the nozzle body 2 substantially over its entire height. In manner known per se, the heating sleeve comprises an electric resistance which is formed by serigraphy for example.

The electric resistance is connected to electrically conductive pads (not illustrated) intended to be placed in contact with means (not illustrated) to supply electricity (e.g. conductive strips) arranged on the die 1. In particularly advantageous manner, the connection of the electric resistance to the contact strips located on the die is achieved by means of the device described in document WO 2007/006899. It is briefly recalled that in this device, a plurality of electrically conductive pads are located in the rear part of the sleeve i.e. at the rear part of the nozzle body.

The sleeve also comprises indexing means (e.g. a longitudinal notch) in relation to which the electrically conductive pads are arranged at a determined angular position. Also, the die comprises means adapted to cooperate with the indexing means and the electrically conductive pads. Preferably, these means are formed of an annular ring in electrically insulating material, removably inserted inside a groove arranged around the longitudinal passage 12 of the injection nozzle, at the rear part thereof.

The annular ring carries the conductive strips of which one end is connected to an electric connector arranged in the die and the other end is intended to ensure electric contact with an electrically conductive pad of the heating sleeve. The annular ring is positioned at a determined orientation relative to the die. The annular ring also comprises indexing means (e.g. a finger) capable of cooperating with the indexing means of the heating sleeve, so that the electric contact between the electrically conductive pads and the strips can only be set up when the heating sleeve is placed in position with the desired orientation.

This device also allows maintenance operations to be simplified, in particular replacement of the heating sleeve. Of course, it is possible to use any other heating means—even no heating means—without departing from the scope of the present invention.

The design of the system according to the invention therefore has the advantage of allowing the use of nozzles of very small size, and in particular of small diameter. It is therefore possible to inject a concave part (e.g. a plug) via the inside i.e. on a non-visible side, which improves the pleasing appearance of the moulded part.

In addition, this system is optimized with regard to thermal considerations since all heat bridges are avoided which would risk causing local cooling of the material. Therefore the linking ring 61 is heated by contact with the manifold. The nozzle body is heated by means of the sleeve 24 substantially over its entire height from the support washer 65 as far as the sealing ring 5 which is located in the vicinity of the injection point. Finally, the washer 62 is made in an incompressible and thermally insulating material.

The invention claimed is:

1. A nozzle for injecting thermoplastic material in the fluid state, comprising:
    (a) two portions sliding in sealed fashion with respect to one another,
        the first portion comprising a nozzle body which, in a longitudinal direction of injection, comprises a longitudinal channel through which the thermoplastic material passes,
        the second portion comprising a linking ring having a passage in which the nozzle body is able to slide in sealed manner; and
    (b) a resilient member cooperating with the two portions to urge the nozzle body in the forward longitudinal direction and the linking ring in the backward longitudinal direction.

2. The injection nozzle of claim 1, wherein the resilient member comprises a first elastic member arranged so as to urge the linking ring backwards.

3. The injection nozzle of claim 2, wherein the resilient member comprises a second elastic member arranged so as to urge the nozzle body forwards.

4. The injection nozzle of claim 3, wherein the second elastic member is arranged between the linking ring and a support element secured to the nozzle body.

5. A system for injecting a thermoplastic material in the fluid state into a mold cavity which, with reference to a longitudinal direction of injection, comprises:
    (a) a rigid molding die having a front face partly delimiting the mold cavity, a rear face and at least one longitudinal passage passing through the die from its rear face to its front face;
    (b) a longitudinal injection nozzle, arranged coaxially inside the passage, and comprising a longitudinal channel;
    (c) a manifold feeding the channel of the nozzle with thermoplastic material in the fluid state, located behind the rear face of the die and mechanically connected thereto, the manifold comprising a longitudinal feed channel leading towards the front;
        wherein the nozzle comprises two portions which slide in sealed manner with respect to one another:
            the first portion comprising a nozzle body of which a front region bears upon the die;
            the second portion comprising a linking ring having a passage in which the nozzle body is able to slide in sealed manner, and comprising a rear face in sliding contact against the front face of the manifold; and
    (d) a resilient device cooperating with the two portions to urge the nozzle body in the forward longitudinal direction and the linking ring in the backward longitudinal direction.

6. The system of claim 5, wherein the front end of the nozzle, via a shoulder, bears flat against an annular sealing ring.

7. The system of claim 5, wherein the resilient device comprises:
    a first elastic member arranged between the rear face of the die and the linking ring so as to ensure, on the linking ring, a backward longitudinal reaction;
    a support washer rigidly connected to the nozzle body; and
    a second elastic member arranged between the linking ring and the support washer, so as to ensure on the support washer a forward longitudinal reaction.

8. The system of claim 5, wherein at ambient temperature, the axis of channel of the manifold is offset transversally relative to the axis of the channel of the nozzle, by a distance substantially equal to the transverse expansion of the manifold when it is brought from ambient temperature to the injection temperature, so that at the time of injection the channels of the manifold and of the nozzle are coaxial.

9. A nozzle for injecting thermoplastic material in the fluid state, comprising:
    (a) two portions sliding in sealed fashion with respect to one another,
        the first portion comprising a nozzle body which, in a longitudinal direction of injection, comprises a longitudinal channel through which the thermoplastic material passes,
        the second portion comprising a linking ring having a passage in which the nozzle body is able to slide in a sealed manner;
    (b) a resilient member cooperating with the two portions to urge the nozzle body in the forward longitudinal direction and the linking ring in the backward longitudinal direction, the resilient member comprising:
        a first elastic member arranged so as to urge the linking ring backwards;
        a second elastic member arranged so as to urge the nozzle body fowards, wherein the second elastic member is arranged between the linking ring and a support element secured to the nozzle body; and
    (c) a nut screwed onto the linking ring that surrounds the second elastic member, wherein the nut is urged backwards by the first elastic member.

10. The nozzle of claim 9, wherein the second elastic member is arranged between a front face of the linking ring and a shoulder arranged on the nozzle body.

11. The nozzle of claim 9, further comprising a washer made of incompressible and thermally insulating material arranged at a front part of the first elastic member.

12. The nozzle of claim 9, wherein the nozzle body comprises, at a front part, a shoulder providing a flat surface for bearing onto a sealing ring.

* * * * *